United States Patent Office 3,000,804
Patented Sept. 19, 1961

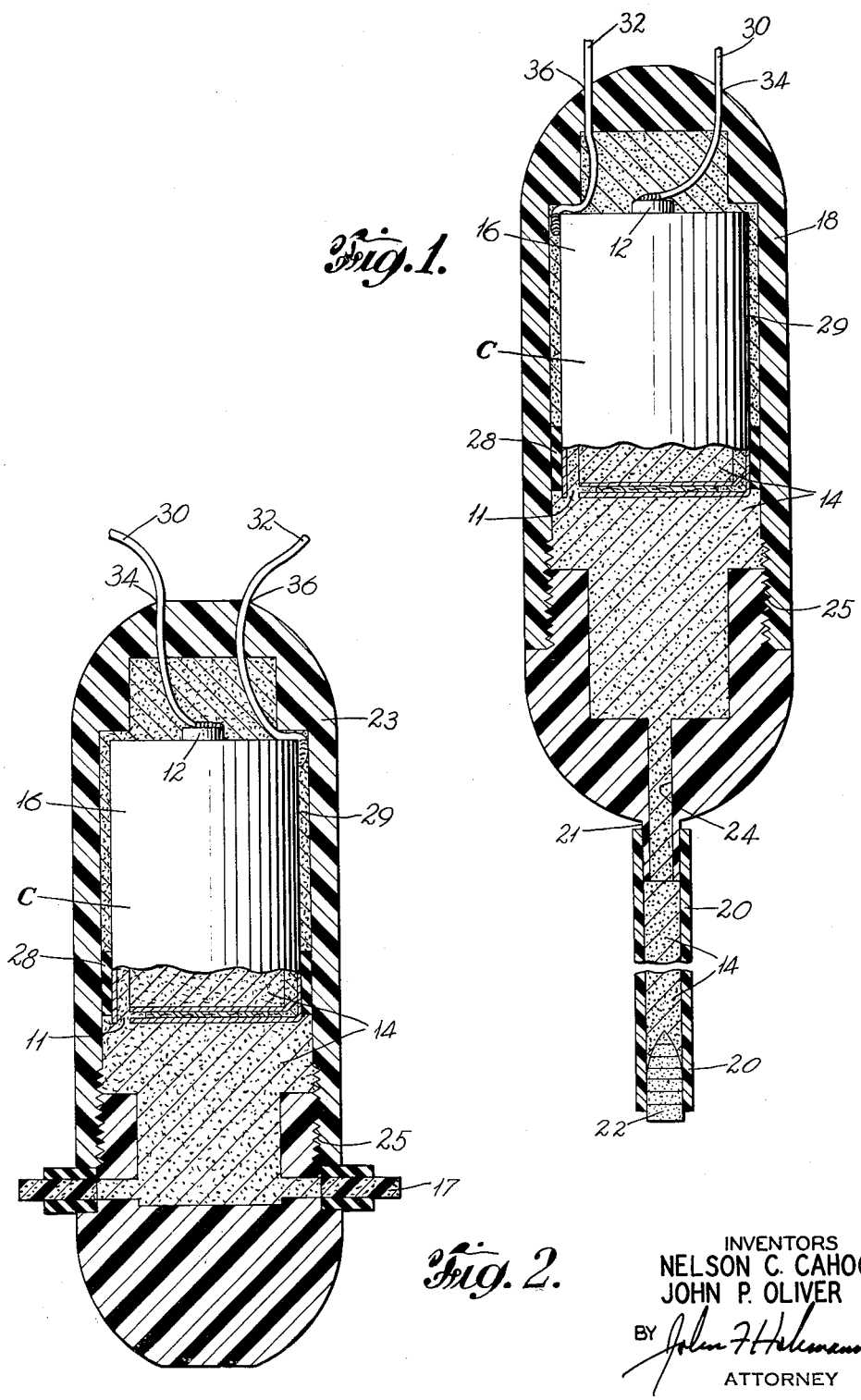

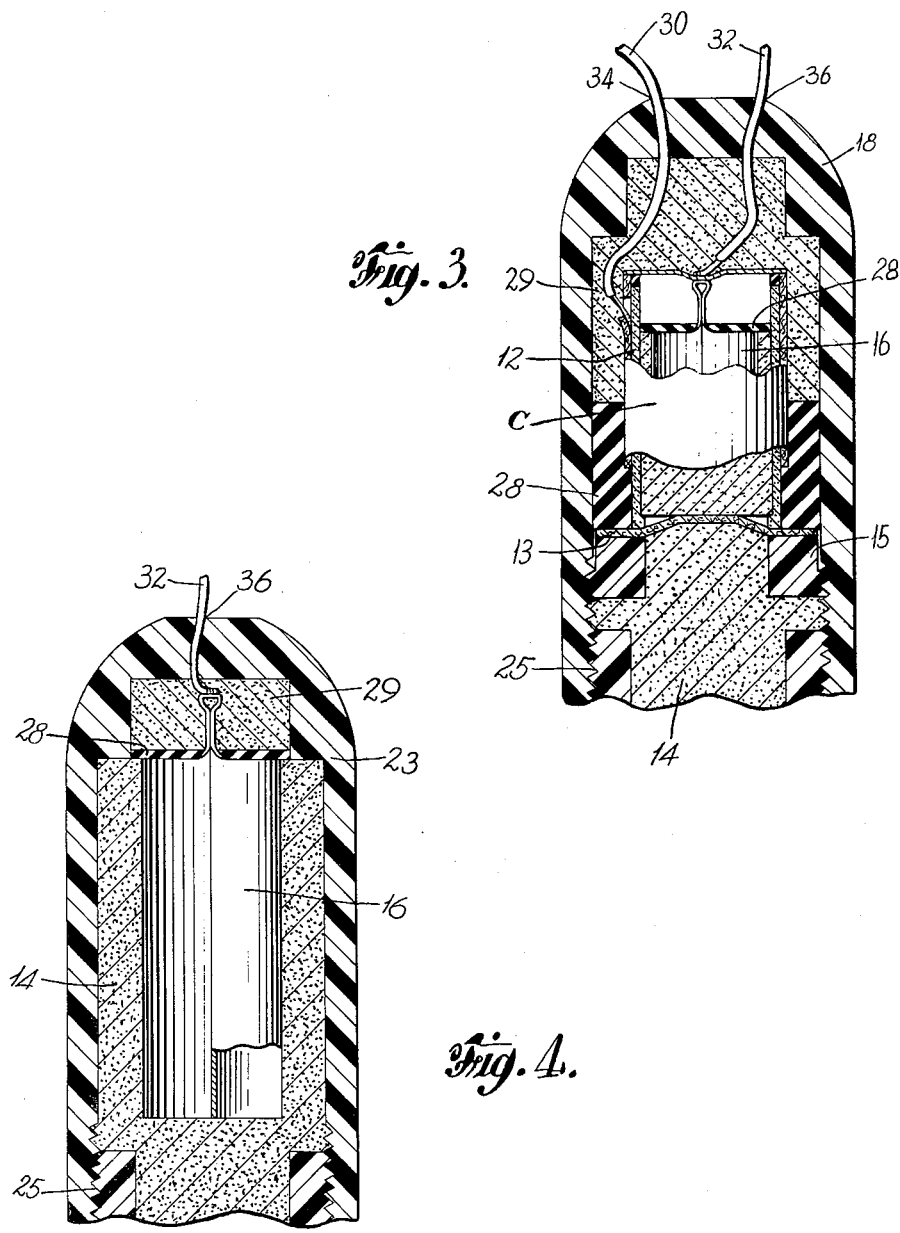

3,000,804
REFERENCE HALF-CELL
Nelson C. Cahoon, Fairview Park, and John P. Oliver, Berea, Ohio, assignors to Union Carbide Corporation, a corporation of New York
Filed May 22, 1958, Ser. No. 737,013
18 Claims. (Cl. 204—195)

This invention relates to reference half-cells and more particularly refers to reference half-cells using a unit dry cell as a basis.

Reference half-cells of many types, such as normal and saturated calomel, mercuric oxide, silver chloride, and hydrogen are well known. These all work very well under laboratory conditions but generally are fragile and subject to breakage. Furthermore, most reference half-cells now in use must be operated in a particular position, such as vertical.

Reference half-cells may be used for various purposes. The determination of ground to cathode and ground to anode potentials in electrode cathodic protection work, controlling automatic watering of plants in greenhouses, by contacting the earth bed thereof, in order to get optimum growth rates, measuring pH in liquids and measuring redox potentials of chemical reactions subject to electrochemical control are only a few of the outstanding uses to which reference half-cells are adapted provided they can be built to withstand the abuses of industrial operation. In the laboratory, the determination of hydrogen ion activity and of pH is very important in studying and carrying out chemical reactions. Reference half-cells are used extensively to determine reference potentials and thus pH and activity.

One of the most important applications to which this invention may be applied is the determination of metal potential within a vibrating part such as an airplane wing in flight. Conventional cells would shatter and spill if allowed to be put into an airplane wing, but the cell of this invention will perform admirably without leakage or breakage during flying time and it serves to give the flight engineer a means of studying changes in the potential properties of a structural element which may be developing to weaken the airplane. This ability to detect metal potential is not limited to airplanes but is applicable to any moving part of almost any machine or operation.

One type of reference half-cell that has often been used for measurements of the potentials developed in the cathodic protection field is the copper-copper sulfate unit. While it has the advantages of a plastic container, it has several disadvantages which limit the usefulness to a considerable degree. Probably the most important disadvantage is the tendency of the copper element to become coated by a layer of black oxide of copper. This coating interferes with the maintenance of a constant reference potential and the unit requires dismantling, cleaning and refilling at regular intervals. Furthermore, this reference cell has a higher temperature coefficient of voltage than many other systems so much so that any measurements not made at the calibrating temperature must be corrected to equivalent values at a standard temperature. The use of this reference cell offers the hazard that copper salts will diffuse out of it and contaminate the system being studied. When systems involving metals more electronegative than copper in the electromotive series are contacted by copper solutions, metallic copper is precipitated and may cause severe local corrosion and provide seriously misleading potential values.

Drawbacks of fragility and position have made the use of most cells impractical for industrial operations. In order for a half-cell to be of use in industrial application, the cell must be non-fragile, adapted to use in any position and low in electrolytic path resistance. The electrode should not be appreciably changed in potential by variance in temperature or by the small amount of current drawn by the measuring instrument and there should be a simple, direct method of checking the electrode potential.

An object of this invention is to provide a reference half-cell which is generally superior to those of the prior art for industrial application.

A further object of this invention is to provide a reference half-cell which is substantially break-resistant.

Another object of this invention is to provide a substantially break-resistant half-cell which may be used in any position desired.

Another object of this invention is to provide a reference cell which provides internal means for checking reliability of operation while in use.

Another object of this invention is to provide a reference half-cell with an electrolyte of improved properties.

Another object of this invention is to provide a reference half-cell which will not furnish, by diffusion at the electrolyte contact to another system, a salt of a metal which will plate out on the metals customarily used in chemical equipment such as iron, lead, tin, nickel, cobalt, cadmium, bismuth, copper, and silver.

Another object of this invention is to provide a reference half - cell with a low temperature coefficient of voltage.

In the drawing:

FIG. 1 is a vertical section of a reference half-cell embodying the invention.

FIG. 2 is a vertical section similar to FIG. 1, of a modified contacting means in conjunction with a reference half-cell embodying this invention.

FIG. 3 is a vertical section similar to FIGS. 1 and 2 showing a modified unit cell construction embodying this invention, part of the cell being broken away.

FIG. 4 is a vertical section similar to FIG. 3 showing a modified cell construction containing only one electrode and embodying this invention, part of the cell being broken away.

The invention is based upon the discovery that by the use of an electrode and the electrolyte of a unit dry cell, with certain modifications, all of the conditions, above enumerated, are met. The invention accordingly comprises a reference half-cell preferably employing the zinc-zinc salt system, the most convenient source of which is in a cell similar to a conventional flashlight battery. The dry cell may be conveniently placed in a nonfragile container made of a suitable polymeric material which generally exhibits substantially break-resistant characteristics. Because of the very nature of a battery of the type used in flashlights, with its electrolyte immobilizer, there is no liquid or gaseous phase which must be kept in a certain position for accurate operation. All elements of such a battery, when enclosed in the polymeric container, remain fixed as to their relative positions to each other. The electrical resistance path of a reference half-cell using a dry cell as a basis is small because of the use of additional electrolyte of the cell as the conductive salt bridge through which potential readings are made. The reference potential of this type of battery is not appreciably changed by drawing current through it. In fact, a zinc electrode will carry several amperes of current for a few seconds and then recover a potential which is almost exactly the same as it possessed before passage of this current, whereas a conventional calomel half-cell for example may be damaged by the passage of even a few milliamperes of current.

A conventional dry Leclanché battery has the added advantage of supplying an internal means for checking the reference potential of the zinc electrode against a secondary source to determine at any given time if the reference potential has varied. The conventional flashlight battery has a predetermined potential as measured across the anode and cathode, and this potential may be checked from time to time to determine whether the zinc electrode potential is still constant. This gives a very reliable indication as to whether the readings taken on the zinc electrode are true.

Referring to FIG. 1 of the drawings, a unit dry cell C, composed of a cathode collector 12, electrolyte 14 and cup shaped anode 16, which also serves as a cell casing, having holes 11 in the base thereof, is adapted to use in this invention. The cell C is in a substantially break-resistant, inert container 18 having additional electrolyte 14 therein. This electrolyte is continuous with the electrolyte 14 in the cell C, communicating therewith through the holes 11.

The substantially break-resistant, inert container 18, has a hole 24 bored therethrough and a flange 21 around the external portion of the hole 24. One end of a substantially flexible, inert tube 20 is fitted to the flange 21 and the other end of the tube is fitted with a porous plug 22. Electrolyte 14 is added to fill the tube 20, the hole 24 and the free space in the container 18.

The container 18 has holes 34 and 36 bored therein which facilitate connection of electrical leads 30 and 32, attached respectively to the cathode collector 12 and the anode 16 of the unit cell C, to outside conventional measuring devices. An insulation ring 28, inserted between the unit cell and the break-resistant container 18, prevents the electrolyte 14 added to the container 18 from coming into contact with the outer side portion of the anode-casing 16. Resin 29 holds the cell C in place within the container 18. The container 18 which serves as a casing is preferably divided into upper and lower sections, to facilitate construction and assembly, which are attached together by conventional means 25.

FIG. 2 of the drawings shows a reference half-cell similar to FIG. 1 with the major difference between the two being the use of a porous annulus 17, saturated with electrolyte 14, instead of the flexible tube 20 of FIG. 1. Here, as in FIG. 1, all free space within the container 23 is filled with electrolyte 14 which is continuous with other electrolyte throughout the system.

FIG. 3 of the drawings shows a reference half-cell which may make contact with the substance, the electric potential of which is sought, by use of either of the constructions shown in FIGS. 1 and 2. In this construction, the cathode collector 12 of the unit cell C acts as the cell casing and the anode 16 is in the center of the cell. A porous washer 13, saturated with electrolyte and resting on a support 15, serves to provide continuity between all the electrolyte 14 of the system.

FIG. 4 of the drawings shows a cell similar to FIG. 3 with only an anode 16 and electrolyte 14. As with the cell shown in FIG. 3, either of the contact means shown in FIG. 1 or 2 may be used with this construction.

In one specific embodiment of the invention, a unit dry cell employing amalgamated zinc as the anode and cell casing; a 15 percent aqueous zinc chloride solution saturated with ammonium chloride as an electrolyte; sodium carboxymethyl cellulose as an electrolyte thickening and gelling agent; manganese dioxide depolarizer; and a carbon cathode collector was modified by providing an opening in the base of the cell to facilitate continuity between the electrolyte in the cell and more electrolyte to be furnished outside the cell. The cell and extra electrolyte were placed in one part of a generally cylindrical container made of polymethyl methacrylate into which two holes had been bored. An insulating ring was placed between the cell and the container with the base of the insulating ring even with the base of the cell. The two holes of the container were in proximity to the terminals of the cell and electrical lead wires were attached to the terminals through these holes. The cell was held in place within the container by means of a phenol-formaldehyde resin. This part of the container, with the cell fixed therein, was then fitted by conventional means to a second or base part which also was of polymethyl methacrylate, having attached thereto a substantially porous annulus made of cellulose sponge. The annulus absorbed electrolyte, which also filled all the free space in the container, and acted as a contact point where electrolyte was to contact the substance, the electric potential of which was sought.

An experimental trial was run using a reference half-cell of the type shown in FIG. 2 to test cathodic protection of an underground conduit. The cell was dragged through a duct in an underground tile passage paralleling lead sheathed cables and the potentials developed between the reference half-cell and the lead cable sheath were measured and recorded as a function of the distance from one end of the cable to the other. Immediately thereafter, a conventional lead electrode, composed of a two food length of lead cable sheath suitably mounted on a wooden rod, was dragged through the same passage and the potentials between the lead electrode and the cable sheath, as a function of the distance from one end of the cable to the other, were recorded.

The use of the lead electrode is the old method of checking potential in such a system. One of the faults of this old method of measuring potentials is that the electrode becomes polarized as it is pulled through the duct. Because of this, a very high resistance (suitably 200,000 ohms per volt) voltmeter must be used for measuring the potential. This polarization which occurs in the lead slug, makes it necessary to stop progress of the slug through the duct about every three feet to make the necessary readings.

The half-cell has the distinct advantage of being able to measure the potential continuously without having to stop the progress through the duct, thus showing one advantage of the reference half-cell resulting from the lack of polarization in this unit. It was possible, with the aid of the present half-cell, to locate a very short area about one foot long in which the voltage recorded was 0.12 volt lower than on either side. The fact that the voltage found was 0.12 volt less than it was on either side of the section, tends to show that there was increased corrosion at that point and that the cathodic protection afforded the conduit at that point had failed to function properly, or that protection of that area would have to be increased to compensate for increased corrosion occurring at that point. This trial run was of particular advantage to the experimenter in that this low spot was completely missed by the survey with the lead electrode even though the portion of the duct in which the test was run had been surveyed many times prior to the run made with the half-cell.

The tests run also pointed up another distinct advantage of the half-cell of this invention over the old method of measuring potentials in a duct by means of the lead electrode. It was possible to test the reference cell as to its own reliability by checking the anode against the cathode suitably at intervals of thirty to fifty feet in the duct. It was found, in checking the reference cell voltage, that the potential remained constant throughout the test. This means that the sheath potentials measured were true. It is impossible to do this with the lead electrode.

In using reference cells of the conventional type, the unit is usually partially immersed in the liquid to be contacted, thus being exposed to the temperature at which this liquid is maintained. Corrections are often applied to the potential measurements obtained to correct for the use of the unit if such solutions are at temperatures greatly above or below room temperature. In the cell construction shown in FIG. 1, only the tip of the electrolytically conductive circuit, i.e, the end of the tube filled with immobilized electrolyte, need be exposed to the temperature conditions being encountered. Thus for example, the reference half-cell unit can be maintained at room temperature while the tip is in contact with a hot solution as in a chemical processing tank. As a result of this, the correction applied to the potential measurement may be small or negligible, depending on the conditions prevailing.

While certain materials have been used in describing this invention above, these are merely the preferred materials and many other substances may be used in their stead without departing from the spirit and scope of this invention. The container may be made of any substantially rigid, insulating, impervious, break-resistant material such as polymethyl methacrylate, styrene-acrilonitrile copolymer, polyester or vinyl polymers, epoxy or phenolic resins and others. The unit cell may be of any conventional construction and the arrangement of the parts may be varied as by using a normal unit cell having the anode act as the cell container or by using the inside-out type of cell having the cathode act as the cell container. The cell may be so constructed as not to have a cathode at all. It is conceivable, and is in some instances practical, for the reference half-cell of this invention to be constructed of an anode and electrolyte either or both of which vary from the particular materials herein above described. Calcium chloride or lithium chloride may be used as electrolytes for low temperature operation and alkaline cells using mercuric oxide or manganese dioxide are adaptable to use in the practice of this invention. Other electrochemical systems may also be used. Where a cell of the Leclanché system is to be used, the electrolyte may range from 5 to 50 percent aqueous zinc chloride solution without losing the benefit of this invention.

As applied to the modification as shown in FIG. 1, the flexible tube may be constructed of any flexible, insulating, impervious, break-resistant material such as polyethylene, vinyl polymers and copolymers, butadiene polymers, butadiene-styrene copolymers and many more. As to FIG. 2, the porous annulus may be made of any substantially insulating material which will not react with the electrolyte used or the substance to be measured. Some examples of materials which may be used in preparing this annulus are polyurethane foam, paper, cloth, cellulose sponge, nylon sponge, natural sponge, foam rubber, porous ceramics and others.

It is to be observed that the particular constructions herein-above shown represent the preferred form of this invention. The principles relating thereto may readily be applied to different types of cells useful as reference half-cells. To this end, wafer and flat type cells of the unit and duplex electrode structure have been made which are adapted to use in this invention by the simple expedient of extending the electrolyte thereof to make contact with the material, the electric potential of which is sought.

What is claimed is:

1. A reference half-cell for measuring electric potentials comprising at least one electrode and an immobilized electrolyte at least partially composed of a salt of said electrode material, said electrode and said electrolyte being in physical contact and being encased in a substantially impervious, insulating, break-resistant container, said container having conduit means extending therethrough filled with additional immobilized electrolyte which additional electrolyte is in electrical contact with said electrolyte and which additional electrolyte is exposed through said conduit means at a point external to said container, said exposed additional immobilized electrolyte forming a salt bridge for contacting a material, the electric potential of which is sought, said electrode and said electrolyte each being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

2. A reference half-cell for measuring electric potentials comprising at least one amalgamated zinc electrode and an immobilized electrolyte at least partially composed of a zinc salt, said electrode and said electrolyte being in physical contact and being incased in a substantially impervious, insulating, break-resistant container, said container having conduit means extending therethrough filled with additional immobilized electrolyte which additional electrolyte is in electrical contact with said electrolyte and which additional electrolyte is exposed through said conduit means at a point external to said container, said exposed additional immobilized electrolyte forming a salt bridge for contacting a material the electric potential of which is sought, said electrode and said electrolyte each being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

3. A reference half-cell for measuring electric potentials comprising at least one electrode and an electrolyte composed of a zinc salt, an ammonium salt and at least one thickening agent, said thickening agent rendering said electrolyte substantially immobilized, said electrode and said electrolyte being in physical contact and being encased in a substantially impervious, insulating, break-resistant container, said container having conduit means extending therethrough filled with additional immobilized electrolyte which additional electrolyte is in electrical contact with said electrolyte and which additional electrolyte is exposed through said conduit means at a point external to said container, said exposed additional immobilized electrolyte forming a salt bridge for contacting a material the electric potential of which is sought, said electrode and said electrolyte each being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

4. A reference half-cell for measuring electric potentials comprising at least one electrode and an immobilized electrolyte at least partially composed of a salt of said electrode material, said electrode and said electrolyte being in physical contact and being encased in a substantially impervious, insulating, break-resistant container, said container having a flexible tube extending therefrom, said tube being filled with said electrolyte, said container having conduit means extending therethrough filled with additional immobilized electrolyte which additional electrolyte is exposed through said conduit means at a point external to said container, said exposed additional immobilized electrolyte forming a salt bridge through said flexible tube for contacting a material the electric potential of which is sought, said electrode and electrolyte being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

5. A reference half-cell for measuring electric potentials comprising at least one electrode and an immobilized electrolyte at least partially composed of a salt of said electrode material, said electrode and said electrolyte being in physical contact and being encased in a substantially impervious, insulating, break-resistant container, said container having therearound a sponge-like annular member containing electrolyte therein, said container having conduit means extending therethrough filled with additional immobilized electrolyte which additional electrolyte is in electrical contact with said electrolyte and which additional electrolyte is exposed through said conduit means at a point external to said container, said exposed additional immobilized electrolyte forming a salt bridge through said member for contacting a material the electric potential of which is sought, said electrode and electrolyte being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

6. A reference half-cell for measuring electric potentials comprising a unit dry cell, said cell having separate conductive connections attached to an electrode and the immobilized electrolyte thereof and being encased in a substantially impervious, break-resistant container wherein additional immobilized electrolyte occupies space in said container and is in electrical contact with said immobilized electrolyte within said unit dry cell, said container having conduit means therethrough containing additional immobilized electrolyte in electrical contact with said unit dry cell immobilized electrolyte through said electrolyte in said container, said additional electrolyte in said conduit means being exposed through said conduit means at a point external to said container to form a salt bridge for contacting a material the potential of which is sought, said half-cell being characterized by its substantially constant reference potential, low temperature coefficient of voltage, corrosion resistance and by its ability to avoid diffusion of electrolyte containing a salt of a metal which will plate out on said material.

7. A reference half-cell for measuring electric potentials comprising a unit dry cell having holes punched in the base thereof and being encased in a substantially impervious, insulating, break-resistant container having a flexible tube extending therefrom, said container and said tube being filled with immobilized electrolyte identical to the electrolyte in said unit cell and continuous therewith through said holes, said immobilized electrolyte forming a salt bridge through said tube for contacting a material the electric potential of which is sought, the electrodes and electrolyte of said cell being attached to separate conductive connections, said half-cell being characterized by its substantially constant reference potential, low temperature coefficient of voltage, corrosion resistance, by its ability to avoid diffusion of electrolyte containing a salt of a metal which will plate out on said material.

8. A reference half-cell for measuring electric potentials comprising a unit dry cell having holes punched in the base thereof and being encased in a substantially impervious, insulating, break-resistant container having therearound a sponge-like annular member, said member and said container being filled with immobilized electrolyte identical to the electrolyte in said unit cell and continuous therewith through said holes, said immobilized electrolyte forming a salt bridge through said member for contacting a material the electric potential of which is sought, the electrodes and electrolyte of said cell being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

9. A reference half-cell for measuring electric potentials comprising a unit dry cell composed essentially of an amalgamated zinc anode, a carbon cathode collector, manganese dioxide depolarizer, and an electrolyte of zinc chloride solution saturated with ammonium chloride to which has been added sodium carboxymethyl cellulose thickening agent, said cell being encased in a polymethyl methacrylate container having a flexible polyvinyl chloride tube extending therefrom, said container and said tube being filled with electrolyte identical to said electrolyte in said unit cell, said unit cell having holes in the base thereof to facilitate communication between said electrolyte, said electrolyte forming a salt bridge through said tube for contacting a material, the electric potential of which is sought, said electrodes and said electrolyte of said cell being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

10. A reference half-cell for measuring electric potentials comprising a unit dry cell composed essentially of an amalgamated zinc anode, a carbon cathode collector, manganese dioxide depolarizer, and an electrolyte of zinc chloride solution saturated with ammonium chloride to which has been added sodium carboxymethyl cellulose thickening agent, said cell being encased in a polymethyl methacrylate container having therearound an annular cellulose sponge-like member, said member and said container being filled with electrolyte identical to said electrolyte in said unit cell and continuous therewith through holes in the base of said unit cell, said electrolyte forming a salt bridge through said annular member for contacting a material, the electric potential of which is sought, said electrodes and said electrolyte of said cell being attached to separate conductive connections, said half-cell being characterized by its substantially constant reference potential, low temperature coefficient of voltage, corrosion resistance and by its ability to avoid diffusion of electrolyte conating a salt of a metal which will plate out on said material.

11. A reference half-cell for measuring electric potentials comprising an amalgamated zinc electrode and electrolyte composed essentially of zinc chloride, ammonium chloride and sodium carboxymethyl cellulose thickening agent said electrode and said electrolyte being encased in a polymethyl methacrylate container having an electrolyte filled flexible polyvinyl chloride tube extending therefrom, said electrolyte in said tube being in electrical contact with said electrolyte in said container and being exposed through said tube external to said container, said electrolyte forming a salt bridge through said tube for contacting a material the electric potential of which is sought, said electrode and said electrolyte being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

12. A reference half-cell for measuring electric potentials comprising an amalgamated zinc electrode and an electrolyte composed essentially of zinc chloride, ammonium chloride and sodium carboxymethyl cellulose thickening agent, said electrode and said electrolyte being encased in a polymethyl methacrylate container having an electrolyte filled cellulose sponge-like annular member therearound, said electrolyte in said member being in electrical contact with said electrolyte in said container and being exposed through said member external to said container, said electrolyte forming a salt bridge through said annular member for contacting a material the electric potential of which is sought, said electrode and said electrolyte being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

13. A reference half-cell for measuring electric potentials comprising a unit dry cell composed essentially of an amalgamated zinc anode, a carbon cathode collector, manganese dioxide depolarizer, and an immobilized electrolyte primarily composed of zinc chloride and at least one compound selected from the group consisting of calcium chloride and lithium chloride, said cell being encased in a polymethyl methacrylate container having a flexible polyvinyl chloride tube extending therefrom, said container and said tube being filled with electrolyte identical to said electrolyte in said unit cell and continuous therewith through holes in the base of said unit cell, said immobilized electrolyte forming a salt bridge through said tube for contacting a material, the electric potential of which is sought, said electrodes and said electrolyte of said cell being attached to separate conductive connections, said half-cell being characterized by its substantailly constant reference potential, low temperature coefficient of voltage, corrosion resistance and by its ability to avoid diffusion of electrolyte containing a salt of a metal which will plate out on said material.

14. A reference half-cell for measuring electric potentials comprising a unit dry cell composed essentially of an amalgamated zinc anode, a carbon cathode collector, manganese dioxide depolarizer, and an immobilized electrolyte primarily composed of zinc chloride and at least one compound selected from the group consisting of calcium chloride and lithium chloride, said cell being encased in a polymethyl methacrylate container having therearound an annular cellulose sponge-like member, said member and said container being filled with electrolyte identical to said electrolyte in said unit cell and continuous therewith through holes in the base of said unit cell, said immobilized electrolyte forming a salt bridge through said annular member for contacting a material, the electric potential of which is sought, said electrodes and said electrolyte of said cell being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

15. A reference half-cell for measuring electric potentials comprising an amalgamated zinc electrode and an immobilized electrolyte primarily composed of zinc chloride and at least one compound selected from the group consisting of lithium chloride and calcium chloride, said electrode and said electrolyte being encased in a polymethyl methacrylate container having an electrolyte filled flexible polyvinyl chloride tube extending therefrom, said electrolyte in said tube being in electrical contact with said electrolyte in said container and being exposed through said tube external to said container, said immobilized electrolyte forming a salt bridge through said tube for contacting a material the electric potential of which is sought, said electrode and said electrolyte being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

16. A reference half-cell for measuring electric potentials comprising an amalgamated zinc electrode and an immobilized electrolyte primarily composed of zinc chloride and at least one compound selected from the group comprising lithium chloride and calcium chloride, said electrode and said electrolyte being encased in a polymethyl methacrylate container having an electrolyte filled cellulose sponge-like annular member therearound, said electrolyte in said member being in electrical contact with said electrolyte in said container and being exposed through said member external to said container, said immobilized electrolyte forming a salt bridge through said annular member for contacting a material the electric potential of which is sought, said electrode and said electrolyte being attached to separate conductive connections, said half-cell being characterized by its substantially constant reference potential, low temperature coefficient of voltage, corrosion resistance and by its ability to avoid diffusion of electrolyte containing a salt of a metal which will plate out on said material.

17. A reference half-cell for measuring electric potentials comprising a unit alkaline cell encased in a polymethyl methacrylate container having a flexible polyvinyl chloride tube extending therefrom, said container and said tube being filled with electrolyte identical to immobilized electrolyte of said alkaline cell and continuous therewith through holes in the base of said immobilized alkaline cell, said electrolyte forming a salt bridge through said tube for contacting a material the electric potential of which is sought, separate conductive connections being attached to said electrolyte and the electrodes of said alkaline cell, said half-cell being characterized by its substantially constant reference potential, low temperature coefficient of voltage, corrosion resistance and by its ability to avoid diffusion of electrolyte containing a salt of a metal which will plate out on said material.

18. A reference half-cell for measuring electric potentials comprising a unit alkaline cell encased in a polymethyl methacrylate container having therearound an annular cellulose sponge-like member, said member and said container being filled with electrolyte identical to immobilized electrolyte in said alkaline cell and continuous therewith through holes in the base of said immobilized alkaline cell, said electrolyte forming a salt bridge through said annular member for contacting a material the electric potential of which is sought, separate conductive connections being attached to said electrolyte and the electrodes of said alkaline cell, said half-cell being characterized by its substantially constant reference potential, low temperature coefficient of voltage, corrosion resistance and by its ability to avoid diffusion of electrolyte containing a salt of a metal which will plate out on said material.

References Cited in the file of this patent

UNITED STATES PATENTS

| | | |
|---|---|---|
| 2,631,181 | Ruben | Mar. 10, 1953 |
| 2,756,203 | Gilbert | July 24, 1956 |
| 2,846,386 | Ingruber | Aug. 5, 1958 |

FOREIGN PATENTS

| | | |
|---|---|---|
| 679,890 | Great Britain | July 21, 1950 |